US010228301B2

(12) United States Patent
Kusumura et al.

(10) Patent No.: US 10,228,301 B2
(45) Date of Patent: Mar. 12, 2019

(54) WATER-LEAK STATE ESTIMATION SYSTEM, METHOD, AND RECORDING MEDIUM

(71) Applicant: NEC CORPORATION, Tokyo (JP)

(72) Inventors: Yukitaka Kusumura, Tokyo (JP); Sergey Tarasenko, Tokyo (JP); Riki Eto, Tokyo (JP); Yusuke Muraoka, Tokyo (JP); Ryohei Fujimaki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/573,039

(22) PCT Filed: Mar. 10, 2016

(86) PCT No.: PCT/JP2016/001355
§ 371 (c)(1),
(2) Date: Nov. 9, 2017

(87) PCT Pub. No.: WO2016/181593
PCT Pub. Date: Nov. 17, 2016

(65) Prior Publication Data
US 2018/0136076 A1 May 17, 2018

Related U.S. Application Data

(60) Provisional application No. 62/160,743, filed on May 13, 2015.

(51) Int. Cl.
*G01M 3/28* (2006.01)
(52) U.S. Cl.
CPC ..................... *G01M 3/28* (2013.01)
(58) Field of Classification Search
CPC ........... G01M 3/28; G01M 3/00; G06F 17/10; G06F 17/18; G06F 17/00
See application file for complete search history.

(56) References Cited

U.S. PATENT DOCUMENTS

2012/0185184 A1\* 7/2012 Armon ................. G05B 23/024
702/51
2013/0211797 A1\* 8/2013 Scolnicov .......... G06Q 10/0639
703/2

FOREIGN PATENT DOCUMENTS

JP 56-162029 12/1981
JP 61-103700 7/1986
(Continued)

OTHER PUBLICATIONS

International Search Report dated Jun. 7, 2016, in corresponding PCT International Application.
(Continued)

*Primary Examiner* — Leon Flores
(74) *Attorney, Agent, or Firm* — Finnegan, Henderson, Farabow, Garrett & Dunner, L.L.P.

(57) ABSTRACT

This invention provides a water-leakage state estimation system configured to estimate a state of a water leakage in a specific area of a water distribution network. A learning unit is configured to: receive labeled data, which is labeled so as to separate past flow rate data into abnormal values and normal values, and past environment state condition data; build a prediction model for predicting the normal values in the labeled data through learning; and determine a score parameter defining a length of a period involving data to be verified through learning as well. A water-leakage estimation unit is configured to: compare predicted flow rate data obtained by supplying current environment condition data into the prediction model and current flow rate data to produce error values; and calculate an average value of the error values in the period of a window width defined by the score parameter to estimate a water-leakage score representing a state of the water-leakage in the specific area.

10 Claims, 11 Drawing Sheets

(56) References Cited

FOREIGN PATENT DOCUMENTS

| JP | 2002-55019 | 2/2002 |
| JP | 2003-256965 | 9/2003 |
| WO | WO 2015/063931 | 5/2015 |

OTHER PUBLICATIONS

Partial English Translation of Written Opinion of the International Searching Authority from the Japanese Patent Office dated Jun. 7, 2016, in corresponding PCT International Application.
R. Fujimaki, S. Morinaga: "Factorized Asymptotic Bayesian Inference for Mixture Modeling," JMLR W&CP 22: pp. 400-408, (2012).

* cited by examiner

WATER-LEAK STATE ESTIMATION SYSTEM, METHOD, AND RECORDING MEDIUM

CROSS-REFERENCE TO RELATED PATENT APPLICATIONS

This application is a National Stage Entry of International Application No. PCT/JP2016/001355, file Mar. 10, 2016, which claims the benefit of priority from U.S. Provisional Application No. 62/160,743, filed May 13, 2015. The entire contents of the above-referenced applications are expressly incorporated herein by reference.

TECHNICAL FIELD

This invention relates to a system configured to monitor a water-leakage state in a water distribution network of water supply, and more particularly, to a system, method, and recording medium for estimating a state of a water leakage in a specific area of a water distribution network.

BACKGROUND ART

A water distribution network of water supply is divided into smaller areas referred to as district meter areas (DMAs). In other words, the water distribution network comprises a plurality of DMAs neighboring one another. Flow rate sensors including: a DMA flowmeter; and a flowmeter and a pressure regulating valve (PRV) are arranged at entrances and exits of the respective DMAs. Thus, a water use amount per unit time period [liter/hour] in each DMA can be grasped by measuring flow rates [liter/second] of water flowing into each DMA and flowing out from each DMA by using those flow rate sensors. Each DMA is hereinafter referred to as "monitor area", "measurement area", or simply "area".

As widely known, an actual water use amount varies depending on a measurement time zone (whether it is daytime or nighttime), and changes in a time series. Moreover, the actual water use amount changes depending on a measurement day (whether it is a weekday or a holiday (including Saturday, Sunday, or a national holiday). Further, the actual water use amount changes depending on weather including a temperature and a rainfall. In other words, the actual water use amount changes depending on environment conditions (e.g., the outdoor temperature, the day of week, and the time zone) in the monitor area at that time instant.

Thus, it is conceivable to accumulate past flow rate data representing the water use amount measured in the past in the memory, calculate a predicted value of a current water use amount based on the accumulated data, compare the predicted value and an actual measurement value of the current water use amount with each other, and determine whether or not a water leakage has occurred in the monitor area based on a result of the comparison (a predicted error). In that case, as a material (indicator) for determining whether or not a water leakage exists, a probability (water-leakage score) of occurrence of a water leakage in this monitor area may be produced.

Incidentally, in order to calculate the predicted value of the current water use amount, it is necessary to accumulate an enormous amount of past flow rate data (big data) representing the water use amount measured in the past as the accumulated data in the memory, and to build a prediction model (prediction equation for the water use amount) from the accumulated data through learning.

Meanwhile, as one method of learning the prediction model, there is known heterogeneous mixture learning (HML), which is an analysis technology for heterogeneous mixture data. As one specific example of the heterogeneous mixture learning, there is factorized asymptotic Bayesian inference (FAB) (see, for example, Non Patent Document 1).

Moreover, in Patent Document 1, there is proposed a water-leakage determination method involving comparing a minimum water distribution amount and an allowable water-leakage amount acquired when no leakage exists in water pipes, and determining that a water leakage exists when the minimum water distribution amount is more than the allowable water-leakage amount.

PRIOR ART DOCUMENTS

Patent Document

Patent Document 1: JP 2002-55019 A

Non Patent Document

Non Patent Document 1: R. Fujimaki, S. Morinaga: "Factorized Asymptotic Bayesian Inference for Mixture Modeling," JMLR W&CP 22: pp. 400-408, 2012

SUMMARY OF THE INVENTION

Problem to be Solved by the Invention

However, it is difficult to precisely estimate a state of a water leakage in a water distribution network only by comparing a predicted value of a current water use amount obtained through use of a prediction model and an actual measurement value of the water use amount. This is because the actual measurement value of the current water use amount may quickly increase from a normal value by chance even when a water leakage has not actually occurred. Thus, it is necessary to determine a parameter representing how long such a state needs to continue before being considered as a water leakage in the method of detecting a water leakage by comparing the predicted value and the actual measurement value with each other. Tuning of this parameter has been troublesome.

In Patent Document 1, there is simply disclosed a technology of determining a water leakage by comparing the minimum distribution amount and the allowable water-leakage amount.

Object of the Invention

It is an object of this invention to provide a water-leakage state estimation system, a method, and a recording medium, which are capable of precisely estimating a state of a water leakage in a specific area of a water distribution network.

Means to Solve the Problem

A water-leakage state estimation system according to this invention comprises a water-leakage state estimation system, which is configured to estimate a state of a water leakage in a specific area of a water distribution network, the water-leakage state estimation system comprising: a learning unit configured to: receive labeled data, which is labeled so as to separate past flow rate data representing a water use amount measured in the past in the specific area into abnormal values and normal values, and past environment condition data representing environment conditions at measurement time instants of the past flow rate data; build, through learning, a prediction model for predicting the normal values in the labeled data in response to the past environment condition data; and determine, through learning as well, a first score parameter required for using the prediction model to determine a water leakage, the first score parameter indicating a window width defining a length of a period involving data to be verified; and a water-leakage estimation unit configured to: compare predicted flow rate data obtained by supplying current environment condition data representing current environment conditions into the prediction model and current flow rate data representing a water use amount currently measured in the specific area with each other to produce error values; and calculate an average value of the error values in the period of the window width defined by the first score parameter to estimate a water-leakage score representing a state of the water-leakage in the specific area.

In addition, a water-leakage state estimation system according to this invention comprises a method of estimating a state of a water leakage in a specific area of a water distribution network through use of a water-leakage state estimation system, the method comprising: a learning step, by a learning unit, of: receiving labeled data, which is labeled so as to separate past flow rate data representing a water use amount measured in the past in the specific area into abnormal values and normal values, and past environment condition data representing environment conditions at measurement time instants of the past flow rate data; building, through learning, a prediction model for predicting the normal values in the labeled data in response to the past environment condition data; and determining, through learning as well, a first score parameter required for using the prediction model to determine a water leakage, the first score parameter indicating a window width defining a length of a period involving data to be verified; and a water-leakage estimation step, by a water-leakage estimation unit, of: comparing predicted flow rate data obtained by supplying current environment condition data representing current environment conditions into the prediction model and current flow rate data representing a water use amount currently measured in the specific area with each other to produce error values; and calculating an average value of the error values in the period of the window width defined by the first score parameter to estimate a water-leakage score representing a state of the water-leakage in the specific area.

Furthermore, a computer-readable recording medium according to this invention comprises a computer-readable recording medium having recorded thereon a water-leakage state estimation program for causing a computer to estimate a state of a water leakage in a specific area of a water distribution network, the water-leakage state estimation program causing the computer to execute: a learning procedure for: receiving labeled data, which is labeled so as to separate past flow rate data representing a water use amount measured in the past in the specific area into abnormal values and normal values and past environment condition data representing environment conditions at measurement time instants of the past flow rate data; building, through learning, a prediction model for predicting the normal values in the labeled data in response to the past environment condition data; and determining, through learning as well, a first score parameter required for using the prediction model to determine a water leakage, the first score parameter indicating a window width defining a length of a period involving data to be verified; and a water-leakage estimation procedure for: comparing estimated flow rate data obtained by supplying current environment condition data representing current environment conditions into the prediction model and current flow rate data representing a water use amount currently measured in the specific area with each other to produce error values; and calculating an average value of the error values in the period of the window width defined by the first score parameter to estimate a water-leakage score representing a state of the water-leakage in the specific area.

Effect of the Invention

According to this invention, the state of a water leakage can precisely be estimated in a specific area of a water distribution network.

MODE FOR EMBODYING THE INVENTION

Figure 1:
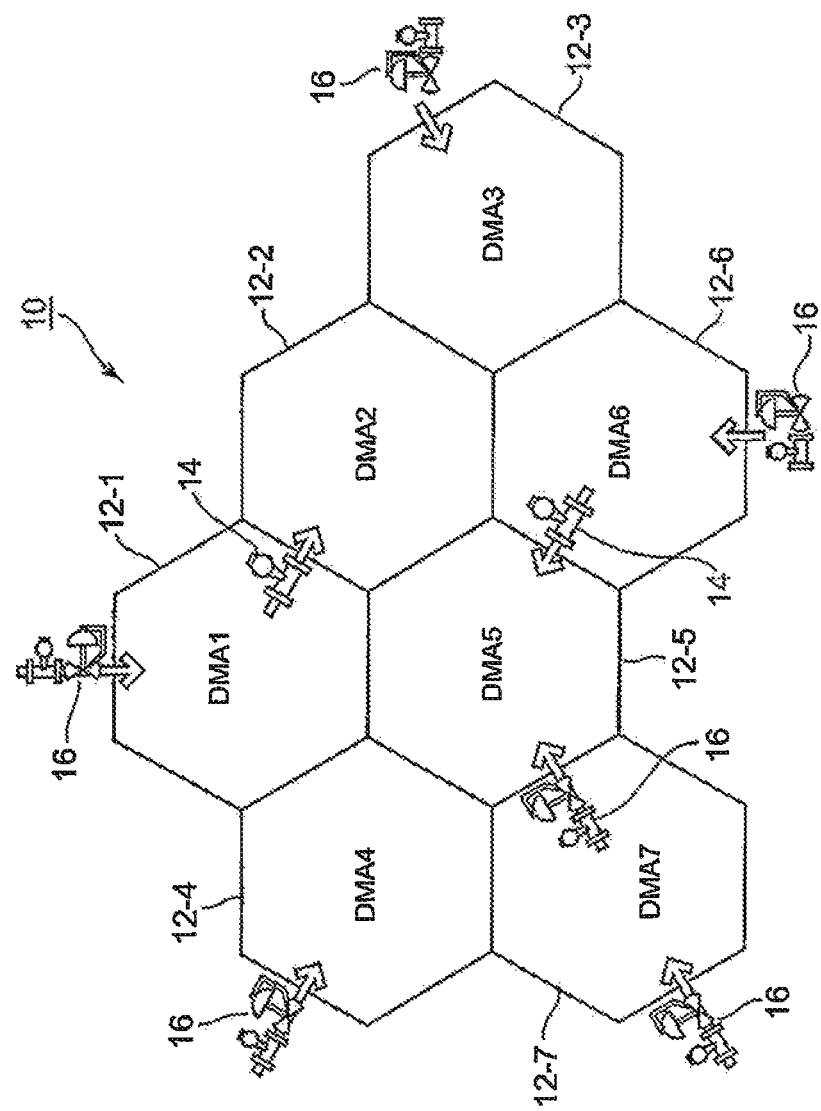
FIG. 1 is a schematic diagram for illustrating an example of a water distribution network of water supply to which a water-leakage state estimation system according to an example embodiment of this invention is applied.

FIG. 1 is a schematic diagram for illustrating an example of a water distribution network 10 of water supply to which a water-leakage state estimation system according to an example embodiment of this invention is applied.

As illustrated in FIG. 1, the water distribution network 10 of the water supply is divided into smaller areas referred to as district meter areas (DMAs). In the example illustrated in FIG. 1, the water distribution network 10 is divided into first to seventh areas 12-1 to 12-7 illustrated as "DMA1" to "DMA7", respectively. In other words, the water distribution network 10 comprises a plurality of DMAs (DMA1 to DMA7) neighboring one another. Each DMA is referred to as "monitor area", "measurement area", or simply "area".

As illustrated in FIG. 1, flow rate sensors including: a DMA flowmeter 14; and a flowmeter and a pressure regulating valve (PRV) 16 are arranged at entrances and exits of the respective monitor areas 12-1 to 12-7. Thus, a water use amount per unit time period [liter/hour] in each of the monitor areas 12-1 to 12-7 can be grasped by measuring flow rates [liter/second] of water flowing into and flowing out from each of the monitor areas 12-1 to 12-7 through those flow rate sensors 14 and 16.

Example Embodiment

Figure 2:
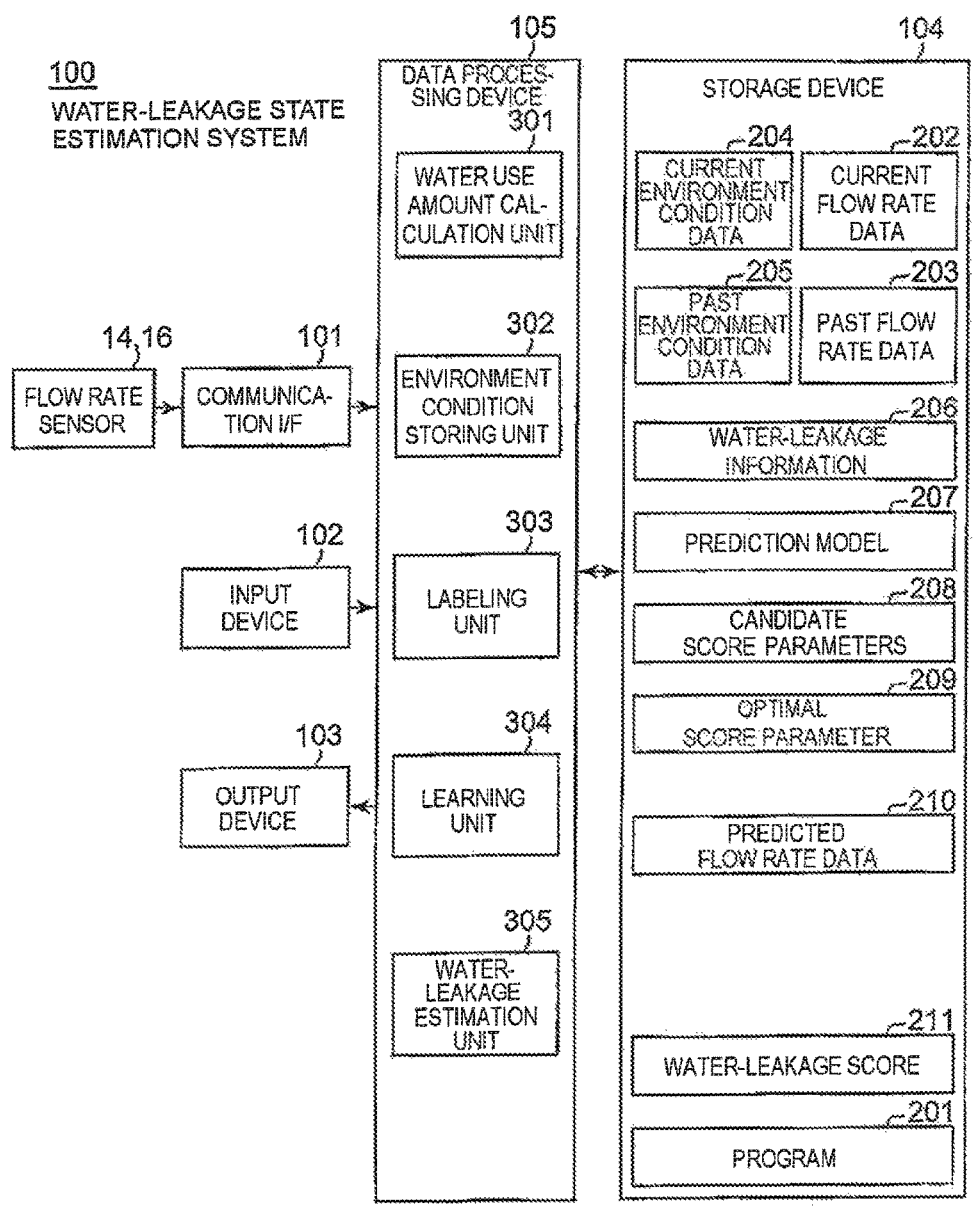
FIG. 2 is a block diagram for illustrating a hardware configuration of the water-leakage state estimation system according to the example embodiment of this invention.

FIG. 2 is a block diagram for illustrating a hardware configuration of the water-leakage state estimation system 100 according to the example embodiment of this invention. The illustrated water-leakage state estimation system 100 can be implemented by a computer operating under program control.

The illustrated water-leakage state estimation system 100 is a system configured to estimate a state of a water leakage in such a specific area of the water distribution network 10 as illustrated in FIG. 1. On this occasion, the specific area may be each of the first to seventh monitor areas 12-1 to 12-7. In this case, the water-leakage state estimation system 100 is configured to estimate the state of the water leakage for each of the monitor areas 12-1 to 12-7. On this occasion, pieces of processing for estimating the state of the water leakage carried out by the water-leakage state estimation system 100 for each of the monitor areas 12-1 to 12-7 are substantially the same. Thus, hereinafter, for the sake of simple description, a description will be given of only a case in which the water-leakage state estimation system 100 estimates the state of the water leakage in one specific monitor area (first monitor area 12-1 in this example).

The specific area may be a set of a plurality of monitor areas neighboring one another, or may be all the areas of the water distribution network 10.

The water-leakage state estimation system 100 comprises a communication interface (hereinafter referred to as "communication I/F") 101, an input device 102 for inputting data, an output device 103 for outputting data, a storage device 104 for storing programs and data described later, and a data processing device 105 for processing data.

The communication I/F 101 comprises a dedicated data communication circuit. The communication I/F 101 has a function of transmitting data received via a communication network (not shown) or wirelessly to the data processing device 105. The input device 102 comprises a keyboard and a mouse. The input device 102 has a function of detecting an operation of an operator, and of transmitting operation information thereon to the data processing device 105.

The communication I/F 101 is configured to receive flow rate data representing a flow rate [liter/second] measured by the flow rate sensors 14 and 16 provided at an entrance and an exit of the first monitor area (specific area) 12-1 via the communication network (not shown) or wirelessly. The measured flow rate data is transmitted to the data processing device 105.

Moreover, the communication I/F 101 is configured to receive weather information on the first monitor area 12-1 released by, for example, the Japan Meteorological Agency, via the Internet or the like (not shown). Instead, the operator may input the weather information on the first monitor area 12-1 from the input device 102. On this occasion, the weather information includes information on the temperature, the humidity, and the like and meteorological information on whether it is rainy, fine, or cloudy and the like in the first monitor area 12-1. The received or input weather information is transmitted to the data processing device 105.

Further, the communication I/F 101 is configured to receive calendar information via the Internet or the like (not shown). Instead, the operator may input the calendar information from the input device 102. On this occasion, the calendar information includes information indicating a year/month/day and the day of week (including distinction for national holidays). The received or input calendar information is transmitted to the data processing device 105.

The weather information and the calendar information indicate environment conditions in the first monitor area 12-1. Thus, a combination of the weather information and the calendar information is referred to as environment state data representing the environment state conditions of the first monitor area 12-1.

The output device 103 comprises a display device, for example, a liquid crystal display (LCD) or a plasma display panel (PDP) and a printer. The output device 103 has a function of displaying, in accordance with instructions from the data processing device 105, various types of information including an operation menu and printing and outputting a final result.

The storage device 104 comprises a hard disk drive and a read-only memory (ROM), a random access memory (RAM), and other such memory. The storage device 104 has a function of storing processing information (described later) required for various types of processing in the data processing device 105 and a program 201.

The data processing device 105 comprises a micro processing unit (MPU) or other such microprocessor or a central processing unit (CPU). The data processing device 105 has a function of reading the program 201 from the storage device 104 to implement various processing units for processing data in accordance with the program 201.

Main processing units implemented by the data processing device 105 comprise a water use amount calculation unit 301, an environment condition storing unit 302, a labeling unit 303, a learning unit 304, and a water-leakage estimation unit 305.

The water use amount calculation unit 301 is configured to receive an inflow flow rate data representing a flow rate [liter/second] of water flowing into the first monitor area 12-1 and an outflow flow rate data representing a flow rate [liter/second] of water flowing out from the first monitor area 12-1, which are measured by the flow rate sensors 14 and 16, via the communication I/F 101. The inflow flow rate data and the outflow flow rate data may be discrete sample data at an interval of 15 minutes or continuous data in a time series. The water use amount calculation unit 301 is configured to calculate a difference between the inflow flow rate data and the outflow flow rate data by subtracting the outflow flow rate data from the inflow flow rate data, and to add up or integrate the difference for a predetermined time period (one hour in this example), to thereby calculate a water use amount per unit time period [liter/hour] in the first monitor area (specific area) 12-1.

The water use amount calculation unit 301 is configured to store current flow rate data 202 representing the water use amount [liter/hour] currently measured in the specific area 12-1 in the storage device 104. Thus, the current flow rate data 202 is updated every predetermined time period (every hour). Moreover, the water use amount calculation unit 301 is configured to store the current flow rate data 202 before the update in the storage device 104 as past flow rate data 203 every predetermined time period (every hour). Thus, the past flow rate data 203 is also updated every predetermined time period. The current flow rate data 202 and the past flow rate data 203 are data to which a time point [hour] is added. The past flow rate data 203 is formed of data for, for example, the past eight years (from 2007 to 2014).

The environment condition storing unit 302 is configured to receive, as the environment condition data, the weather information and the calendar information on the first monitor area 12-1 received via the communication I/F 101 or input from the input device 102. The environment condition storing unit 302 is configured to store current environment condition data 204 indicating the current environment state in the first monitor area (specific area) 12-1 in the storage device 104. The current environment condition data 204 is also updated every predetermined time period (every hour). The current environment condition data 204 comprises the current calendar information and the current weather information.

Moreover, the environment condition storing unit 302 is configured to store the current environment condition data 204 before the update in the storage device 104 as past environment condition data 205 every predetermined time period (every hour). Thus, the past environment condition data 205 is also updated every predetermined time period (every hour). The past environment condition data 205 indicates the environment conditions at the time instants of the measurement of the past flow rate data 203. The past environment condition data 205 is stored in the storage device 104 in association with the corresponding past flow rate data 203 The past environment condition data 205 comprises the past calendar information and the past weather information. The past environment condition data 205 also comprises data for, for example, the past eight years (from 2007 to 2014).

The labeling unit 303 is configured to read the past flow rate data 203 from the storage device 104, and label the past flow rate data 203 so as to separate the past flow rate data 203 into abnormal values with a water leakage and normal values without a water leakage. In other words, the labeling unit 303 is configured to add a water-leakage label to the past flow rate data 203. The labeling unit 303 is configured to store the added water-leakage label in the storage device 104 as water-leakage information 206. The water-leakage information 206 comprises a list of days with a water leakage (list of the abnormal values) and a list of days with a normal flow rate (list of the normal values). A combination of the past flow rate data 203 and the water-leakage information 206 is referred to as labeled data (203, 206). Thus, the labeling unit 303 is configured to refer to the past environment condition data 205, to thereby generate the labeled data (203, 206) from the past flow rate data 203. The separation between the abnormal values and the normal values can be carried out through various known methods. For example, there is a method referred to as night line flow method. This is a method based on such an assumption that users using water in the nighttime (e.g., from 2 a.m. to 4 a.m.) hardly exist, and flow rate data in the nighttime should be constant. In other words, in order to perform comparison as to whether the flow rate of a certain day is an abnormal value or a normal value, the minimum flow rate in 30 days before and after that date is calculated. Then in the method, a comparison is performed between the flow rate in the nighttime and the minimum flow rate to determine the flow rate as an abnormal value when the flow rate is more than a certain threshold. Alternatively, the separation may be carried out based on data, for example, other repair data. The repair data is data formed of, for example, a date, a repair operation day, a pre-repair flow rate, and a post-repair flow rate. It is conceivable that, when a flow rate A before the repair is set as a flow rate in an abnormal state and a flow rate B after the repair is set as a flow rate in a normal state, the separation is carried out based on the data so that, for example, a period exhibiting a flow rate of more than A+B/2 involves the abnormal value and a period exhibiting otherwise involves the normal value.

The learning unit 304 is configured to read the labeled data (203, 206) and the past environment condition data 205 from the storage device 104. The learning unit 304 is configured to build, through learning, a prediction model (prediction equation of the water use amount) 207 for predicting normal values of the labeled data in response to the past environment condition data 205 (203, 206). The learning unit 304 is configured to store the built prediction model 207 in the storage device 104.

In this example, two types of score parameters are used as score parameters required to determine a water leakage by using the prediction model 207. On this occasion, those two types of score parameters are referred to as first and second score parameters T and a. A first score parameter T indicates a window width defining a length of a period involving data to be verified. A second score parameter $\alpha$ indicates a threshold value defining a magnitude of a deviation exhibited between the predicted value and the actual measurement value when the state is considered as a water leakage.

At least the first score parameter T out of the first and second score parameters T and a has a plurality of candidates, and an optimal one is preferred to be selected therefrom. In other words, a fixed value may be used as the second score parameter $\alpha$, but an optimal one is preferred to be selected at least as the first score parameter T.

In the water-leakage state estimation system 100 according to the example embodiment of this invention, a plurality of candidates exist for each of the first and second score parameters T and $\alpha$, and an optimal one is selected therefrom. The learning unit 304 is configured to generate those candidate score parameters 208, and to store the candidate score parameters 208 in the storage device 104.

In detail, according to this example embodiment, the learning unit 304 is configured to select an optimal first score parameter out of a plurality of candidate first score parameters as the first score parameter T and to acquire the optimal first score parameter. Moreover, the learning unit 304 is configured to select an optimal second score parameter out of the plurality of candidate second score parameters as the second score parameter $\alpha$ and to acquire the optimal second score parameter. The learning unit 304 is configured to store optimal score parameters 209 selected in this way in the storage device 104.

The water-leakage estimation unit 305 is configured to read the prediction model 207 and the current environment condition data 204 from the storage device 104. The water-leakage estimation unit 305 is configured to supply the current environment condition data 204 into the prediction model 207, to thereby obtain predicted flow rate data 210.

The water-leakage estimation unit 305 is configured to store the predicted flow rate data 210 in the storage device 104.

The water-leakage estimation unit 305 is configured to then read the predicted flow rate data 210 and the current flow rate data 202 from the storage device 104. The water-leakage estimation unit 305 is configured to compare the predicted flow rate data 210 and the current flow rate data 202, to thereby produce error values (predicted errors). The water-leakage estimation unit 305 is configured to read the optimal score parameters 209 from the storage device 104. The water-leakage estimation unit 305 is configured to use the optimal score parameters 209 to estimate a water-leakage score 211 indicating the state of the water leakage in the first monitor area (specific area) 12-1 from the error values (predicted errors)

In detail, the water-leakage estimation unit 305 is configured to first compare the error values (predicted errors) between the predicted flow rate data 210 (predicted value) and the current flow rate data 202 (actual measurement value) and a threshold value defined by the second score parameter α with each other for binarization, to thereby obtain hinge transform error values. Then, the water-leakage estimation unit 305 is configured to calculate an average value of the hinge transform error values in a period having a window width defined by the first score parameter T, and to produce the average value of the hinge transform error values as the water-leakage score 211 indicating the state of the water leakage in the first monitor area (specific area) 12-1.

The water-leakage estimation unit 305 is configured to store the water-leakage score 211 in the storage device 104, and to send the water-leakage score 211 to the output device 103 for displaying or printing for output.

On this occasion, the "water-leakage score" is a probability of the water leakage in the first monitor area (specific area) 12-1, and takes a value between 0 and 1. A water-leakage score having a value of 0 indicates that no water leakage has occurred in the first monitor area (specific area) 12-1. A water-leakage score having a value of 1 indicates that a water leakage has positively occurred in the first monitor area (specific area) 12-1. Thus, the user can determine whether or not a water leakage has occurred in the first monitor area (specific area) 12-1 based on the water-leakage score produced to the output device 103.

The threshold value for determining whether or not a water leakage has occurred may uniquely be set by the user. For example, it is assumed that the threshold is set to 0.7. In this case, when the water-leakage score is less than 0.7, the user determines that a water leakage has not occurred in the first monitor area (specific area) 12-1. Meanwhile, when the water-leakage score is more than 0.7, the user determines that a water leakage has occurred in the first monitor area (specific area) 12-1. When the water-leakage score 211 is equal to or more than the threshold value, the water-leakage estimation unit 305 notifies the user of an alarm.

Figure 3:
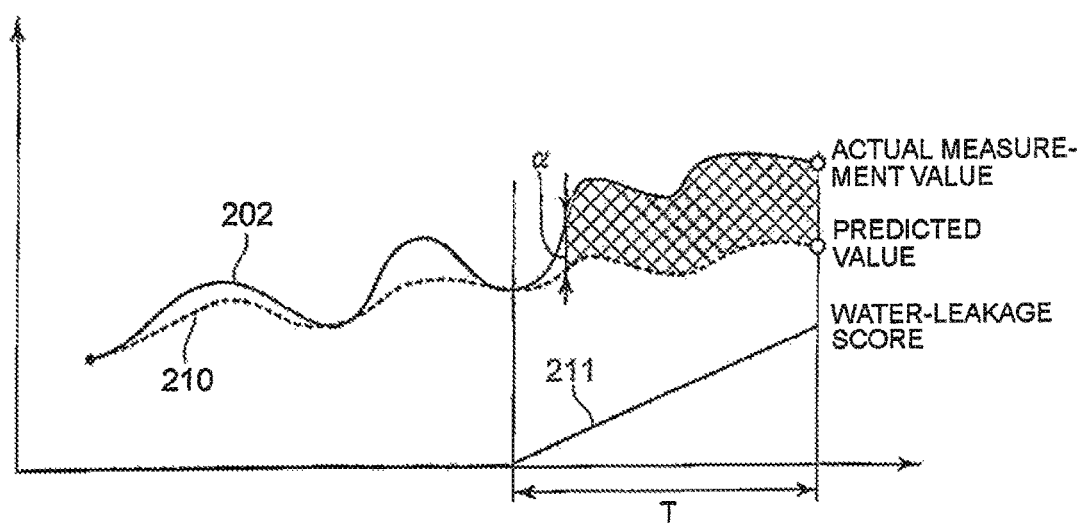
FIG. 3 is a graph for showing a visualization example displayed on a display screen of an output device used for the water-leakage state estimation system illustrated in FIG. 2.

In that case, as shown in FIG. 3, the water-leakage estimation unit 305 is configured to visualize and produce the water-leakage score 211 together with the value (predicted value) in a time series of the predicted flow rate data 210 and the value (actual measurement value) in a time series of the current flow rate data 202 on a display screen of the output device 103 so that a relationship between the first score parameter T and the second score parameter α is recognizable. In FIG. 3, a hatched portion represents a region where the deviation (predicted error) between the predicted value and actual measurement value) is equal to or more than the second score parameter α. As a result, there is provided such an effect that the user can intuitively understand a start timing of the water leakage and the like.

The water-leakage state estimation system 100 illustrated in FIG. 2 may be configured by connecting wiredly or wirelessly physically separated two or more devices.

Figure 4:
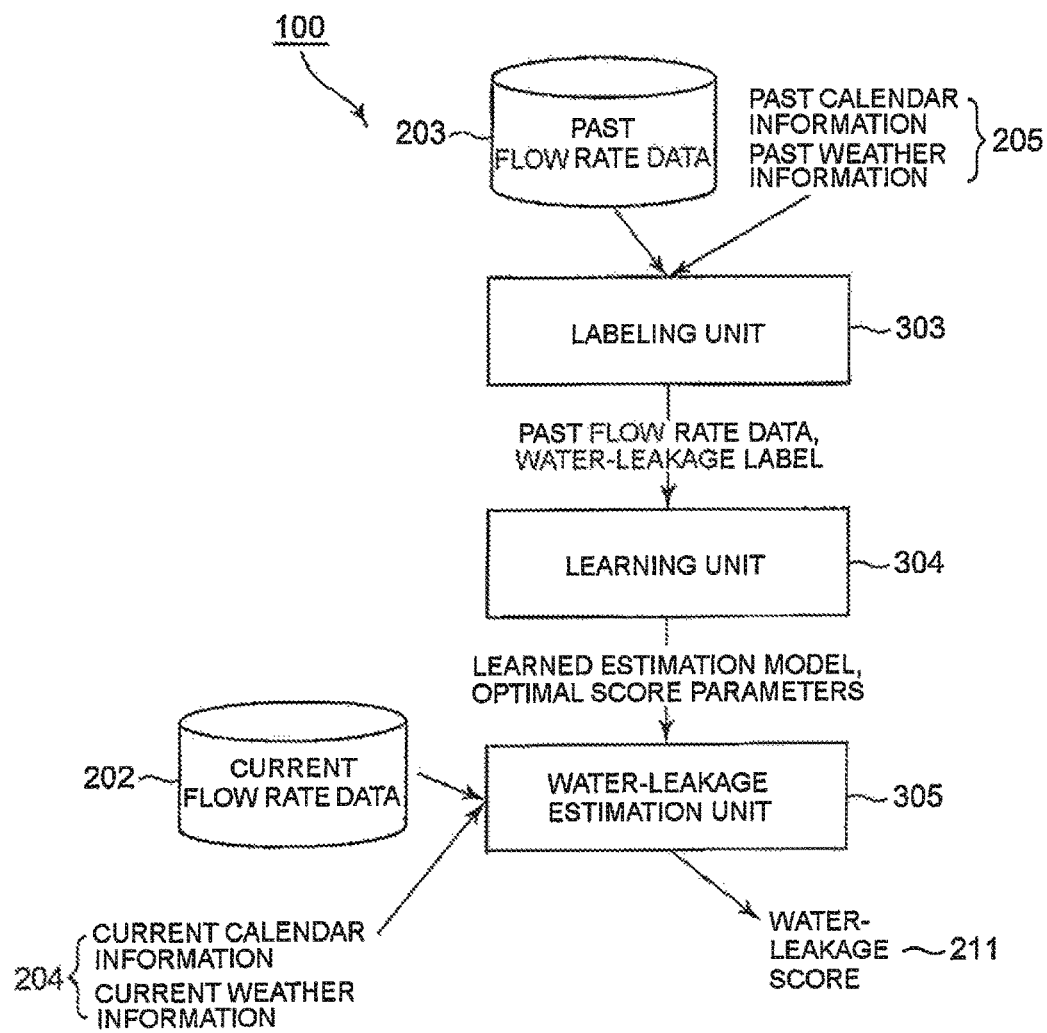
FIG. 4 is a block diagram for illustrating main components of the water-leakage state estimation system illustrated in FIG. 2.

FIG. 4 is a block diagram for illustrating main components of the water-leakage state estimation system 100 illustrated in FIG. 2.

The water-leakage state estimation system 100 comprises the labeling unit 303, the learning unit 304, and the water-leakage estimation unit 305 as the main components.

The labeling unit 303 is configured to receive the past flow rate data 203 and the past environment condition data 205 containing the past calendar information and the past weather information. The labeling unit 303 is configured to separate the past flow rate data 203 into the abnormal values and the normal values, to thereby add the water-leakage label to the past flow rate data 203. The labeling unit 303 is configured to transmit the labeled data (203, 206) comprising the past flow rate data 203 and the water-leakage information 206 representing the water-leakage label to the learning unit 304.

The learning unit 304 is configured to build the prediction model 207 for predicting the normal values in the labeled data (203, 206) through learning. The learning unit 304 is configured to learn the optimal score parameters 209 for determining the water-leakage score based on the measurement values of the past flow rate data 203 and the predicted values obtained by the prediction model 207. The learning unit 304 is configured to transmit the learned prediction model 207 and optimal score parameters 209 to the water-leakage estimation unit 305.

The water-leakage estimation unit 305 is configured to receive the current flow rate data 202 and the current environment condition data 205 containing the current calendar information and the current weather information. The water-leakage estimation unit 305 is configured to supply the current environment condition data 205 into the prediction model 207, to thereby calculate predicted flow rate data 210, which is the predicted value of the current water use amount. Then, the water-leakage estimation unit 305 is configured to calculate the water-leakage score 211 based on the predicted value (predicted flow rate data) 210, the actually measured current water use amount (current flow rate data) 202, and the optimal score parameters 209.

Figure 5:
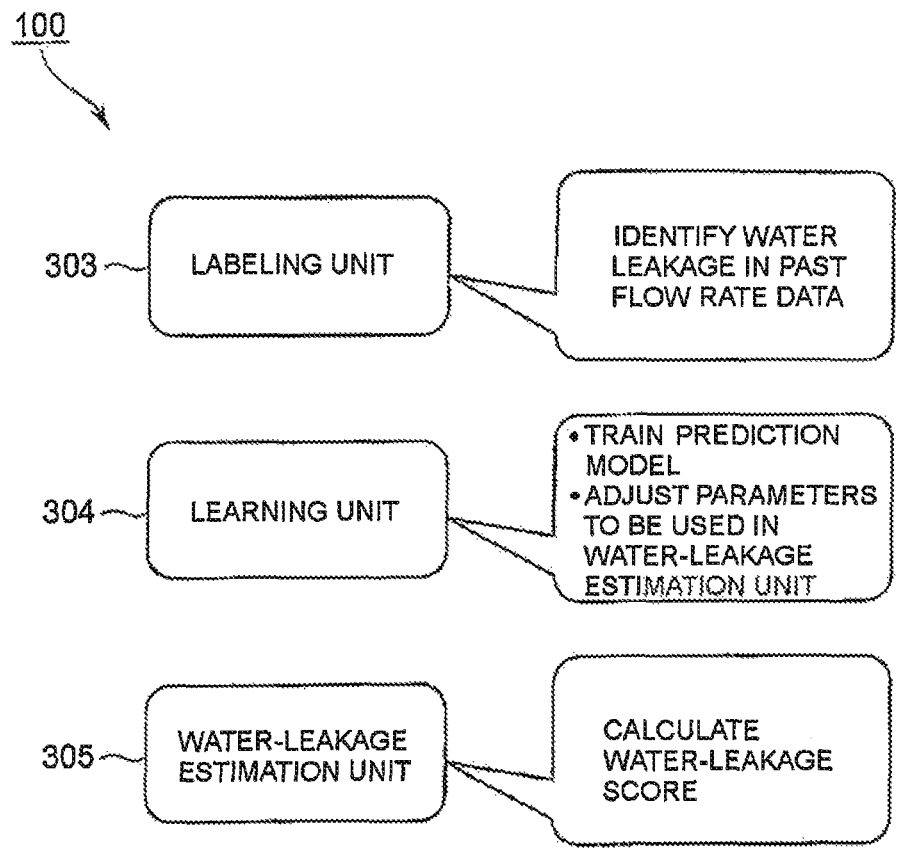
FIG. 5 is a block diagram for illustrating three main components of the water-leakage state estimation system illustrated in FIG. 2.

FIG. 5 is a block diagram for illustrating three main components of the water-leakage state estimation system 100 illustrated in FIG. 2.

The water-leakage state estimation system 100 comprises the labeling unit 303, the learning unit 304, and the water-leakage estimation unit 305 as the three main components.

The labeling unit 303 is configured to identify the water-leakage in the past flow rate data 203. The learning unit 304 is configured to train the prediction model 207, and to adjust the score parameters 209 to be used in the water-leakage estimation unit 305. The water-leakage estimation unit 305 is configured to calculate the water-leakage score 211.

Figure 6:
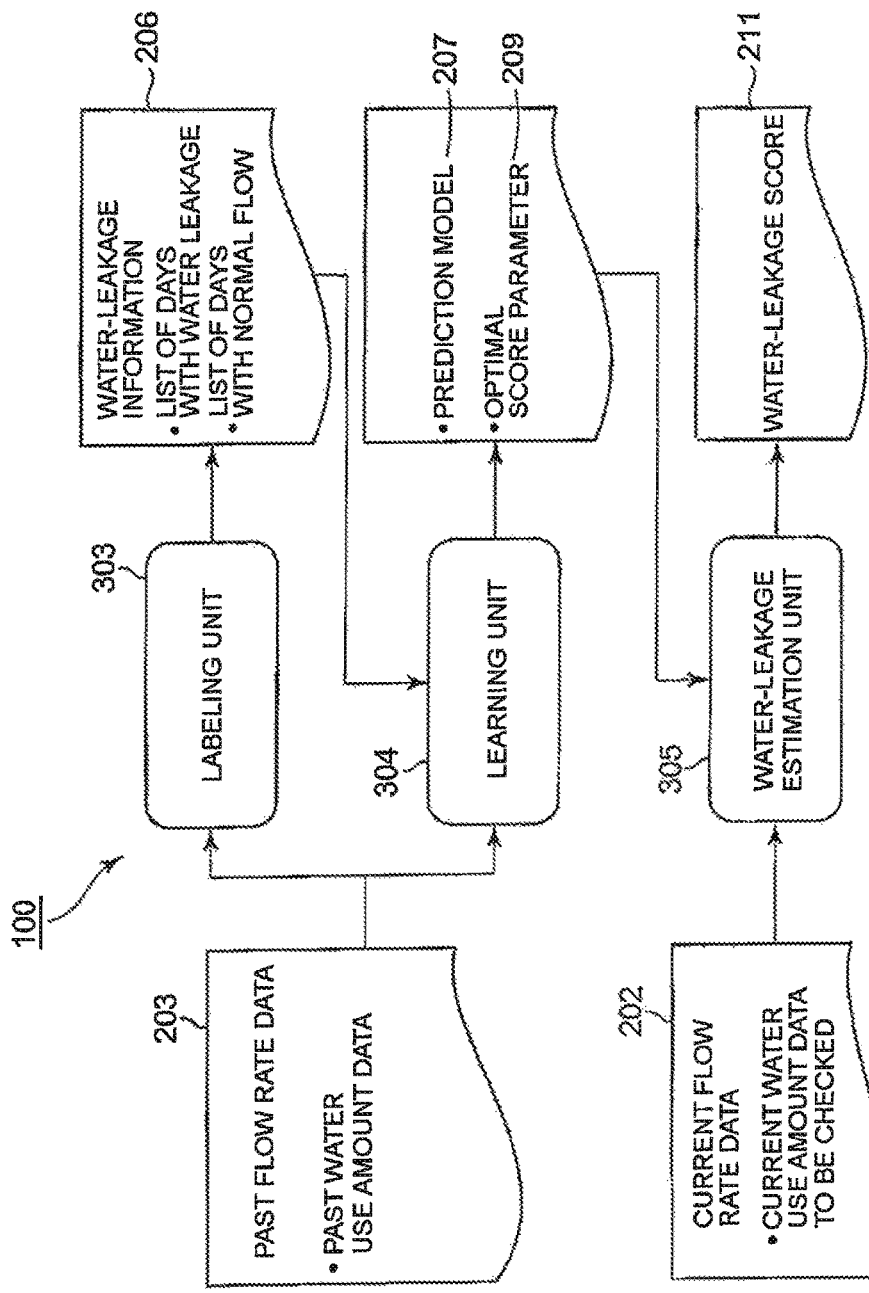
FIG. 6 is a block diagram for illustrating a general operation of the water-leakage state estimation system illustrated in FIG. 5.

FIG. 6 is a block diagram for illustrating a general operation of the water-leakage state estimation system 100 illustrated in FIG. 5.

First, a description will be given of an operation of the labeling unit 303. The labeling unit 303 is configured to read the past flow rate data 203 from the storage device 104. The past flow rate data 203 is the past water use amount data measured in the specific area 12-1. The labeling unit 303 is configured to add the water-leakage information 206, which is the water-leakage label for the separation between the abnormal values and the normal values, to the past flow rate data 202. This water-leakage information 206 comprises the list of the days with the water-leakage and the list of days with the normal flow. The labeling unit 303 is configured to store the water-leakage information 206 in the storage device 104.

A description will be now given of an operation of the learning unit 304. The learning unit 304 is configured to read the past flow rate data 203 and the water-leakage information 206 from the storage device 104. The learning unit 304 is configured to build the prediction model 207 for predicting the normal values from the past flow rate data 203 and the water-leakage information 206 through learning. Moreover, the learning unit 304 is configured to select the optimal score parameters 209 to be used in the water-leakage estimation unit 305. The learning unit 304 is configured to store the prediction model 207 and the optimal score parameters 209 in the storage device 104.

A description will be finally given of the water-leakage estimation unit 305. The water-leakage estimation unit 305 is configured to read the prediction model 207 and the optimal score parameters 209 from the storage device 104. Moreover, the water-leakage estimation unit 305 is configured to read the current flow rate data 202 from the storage device 104. The current flow rate data 202 is the current water use amount data to be examined. The water-leakage estimation unit 305 is configured to compare the predicted value (predicted flow rate data) 210 obtained by supplying the current environment condition data 204 (refer to FIG. 2) into the prediction model 207 and the actual measurement value (current flow rate data) 202 with each other, to thereby produce the error values (predicted errors). The water-leakage estimation unit 305 is configured to use the optimal score parameters 209 to estimate the water-leakage score 211 indicating the state of the water leakage in the first monitor area (specific area) 12-1 from the error values (predicted errors).

Figure 7:
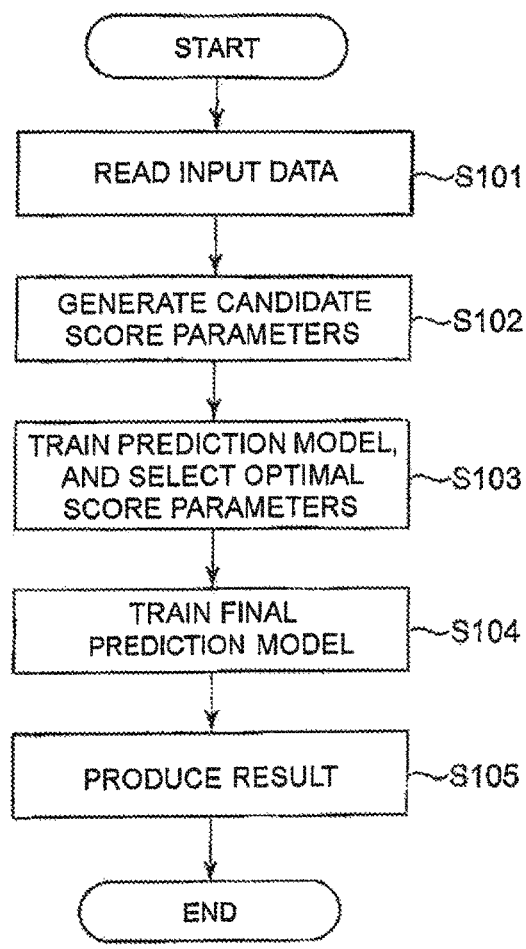
FIG. 7 is a flowchart for illustrating an operation of a learning unit illustrated in FIG. 6.

FIG. 7 is a flowchart for illustrating an operation of the learning unit 304. Referring to FIG. 7, a description will be now given of the operation of the learning unit 304.

First, the learning unit 304 reads the input data from the storage device 104 (Step S101). On this occasion, the input data comprises the past flow rate data and the labeled data.

Then, the learning unit 304 generates the candidate score parameters 208 (Step S102). In detail, the learning unit 304 changes the following first and second score parameters T and $\alpha$, to thereby generate combinations.

For example, the predetermined parameters T and $\alpha$ are as follows.

$T$=[6,12,24]

$\alpha$=[0.7,0.9.1.1]

Then, the following combinations are generated.

$(T,\alpha)$=(6,0.7),(6,0.9),(6,1.1),(12,0.7),(12,0.9),(12,1.1),(24,0.7),(24,0.9),(24,1.1), On this occasion, the unit of the values of the numbers of the first score parameter T is [hours]. The learning unit 304 uses those combinations as the candidate score parameters 208.

Then, the learning unit 304 trains the prediction model 207, to thereby select the optimal score parameters 209 (Step S103).

Figure 8:
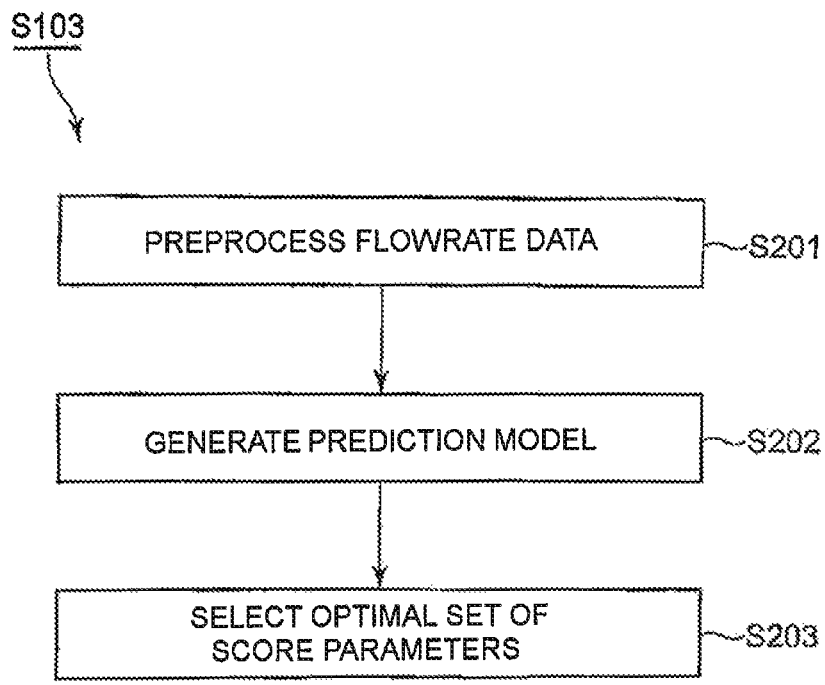
FIG. 8 is a flowchart for illustrating in more detail an operation of Step S103 illustrated in FIG. 7.

Referring to FIG. 8, a detailed description will be further given of this operation of Step S103.

The learning unit 304 first preprocesses the flow rate data (Step S201). In detail, the learning unit 304 compares the data with the maximum value/the minimum value defined in advance, and removes data not existing in a range thereof in order to exclude abnormal values. Moreover, the learning unit 304 generates learning characteristics. On this occasion, the learning characteristics are hour, month, weekday, and holiday.

Then, the learning unit 304 uses samples in a learning period defined in advance to generate the prediction model 207 (Step S202). In other words, the learning unit 304 generates the prediction model 207 for the entire learning period. In detail, the learning unit 304 trains the prediction model 207 from the normal flow rate data. The learning unit 304 uses the heterogeneous mixture learning (HML) to generate, from the learning characteristics, the prediction model 207 for predicting the flow rate data. Then, the learning unit 304 predicts the normal flow rate (normal value) from the prediction model 207.

On this occasion, the heterogeneous mixture learning is one example out of a large number of methods of learning the prediction model for predicting the water use amount in the normal state (assuming that no water leakage has occurred). As disclosed in Non Patent Document 1, the heterogeneous mixture learning technology automatically finds a specific pattern from relationships among data mixed in various types of data, and changes the pattern to be referred to depending on data to be analyzed. As a result, precise prediction and abnormality detection can be carried out even for "data changing in the pattern", which is difficult to be analyzed by "related-art machine learning of fining only a single pattern and referring to the pattern"

Then, the learning unit 304 uses data in a parameter selection period defined in advance to select an optimal set of the score parameters (Step S203). In Step S203, the learning unit 304 first calculates evaluation scores for all the sets of the candidate score parameters. In detail, the learning unit 304 calculates the evaluation scores for all the sets of the candidate score parameters. Then, the learning unit 304 selects a set of score parameters having the maximum evaluation score as the optimal score parameters 209.

Turning back to FIG. 7, the learning unit 304 uses data in a final learning period defined in advance to train a final prediction model 207 (Step S104). In detail, the learning unit 304 trains the prediction model 207 for the latest data. Then, the learning unit 304 stores the prediction model 207 in the storage device 104 (refer to FIG. 2).

Finally, the learning unit 304 produces a result (Step S105). In detail, the learning unit 304 stores the final prediction model 207 and the optimal score parameters 209 in the storage device 104 (refer to FIG. 2).

Figure 9:
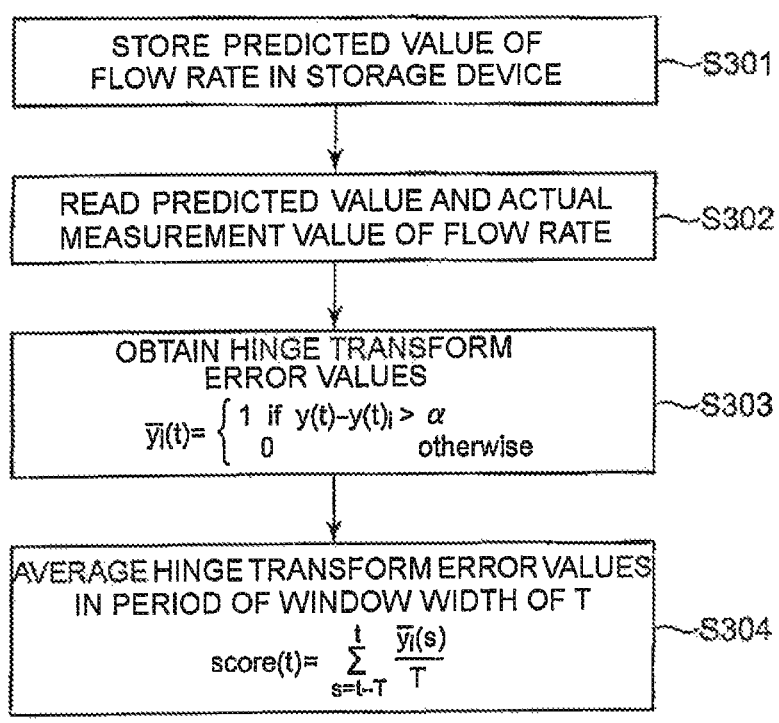
FIG. 9 is a flowchart for illustrating an operation of a water-leakage estimation unit illustrated in FIG. 6.

FIG. 9 is a flowchart for illustrating an operation of the water-leakage estimation unit 305. Referring to FIG. 9, a description will be now given of the operation of the water-leakage estimation unit 305.

First, the water-leakage estimation unit 305 supplies the current environment condition data 204 representing the current environment conditions into the prediction model 207, to thereby obtain the predicted flow rate data (predicted value) 210, and stores the predicted flow rate data 210 in the storage device 104 (Step S301).

Then, the water-leakage estimation unit 305 reads the predicted value (predicted flow rate data) 210 of the flow rate and the actual measurement value (current flow rate data) 202 from the storage device 104 (Step S302). On this occasion, one estimation model exists.

Subsequently, the water-leakage estimation unit 305 compares the error values (predicted errors) between the predicted value 210 and the actual measurement value 202 and the optimal second score parameter α with each other for binarization, to thereby obtain hinge transform error values (Step S303) through Expression (1).

$$\bar{y}_i(t) = \begin{cases} 1 & \text{if } y(t) - y_i(t) > \alpha \\ 0 & \text{otherwise} \end{cases} \quad (1)$$

where y(t) represents the actual measurement value, and $y_i(t)$ represents the predicted value.

Then, the water-leakage estimation unit 305 sums all the hinge transform error values during the period of the window width defined by the optimal first score parameter T, and normalizes the result in accordance with Expression (2), to thereby obtain the water-leakage score, score(t) (Step S304).

$$\text{score}(t) = \sum_{s=t-T}^{t} \frac{\bar{y}_i(s)}{T} \quad (2)$$

As described before, the prediction model 207 from which the abnormal values in case of the water leakage are omitted can be built by labeling the past flow rate data 203 in advance in the water-leakage state estimation system 100 according to this example embodiment. Therefore, there is provided such an advantage that precision of the predicted value (predicted flow rate data) 210 increases.

Moreover, the various score parameters a and T for the separation between the case with the water leakage and the case without the water leakage can automatically be tuned by labeling the past flow rate data 203 in advance in the water-leakage state estimation system 100 according to this example embodiment.

Figure 10:
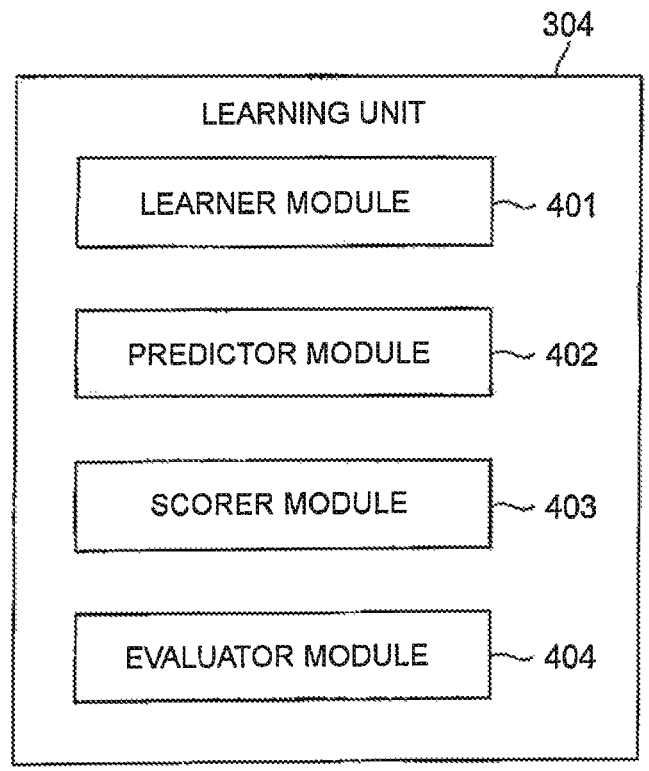
FIG. 10 is a block diagram for illustrating main components of the learning unit used for the water-leakage state estimation system illustrated in FIG. 2.

FIG. 10 is a block diagram for illustrating main components of the learning unit 304 used for the water-leakage state estimation system 100 illustrated in FIG. 2.

The learning unit 304 comprises a learner module 401, a predictor module 402, a scorer module 403, and an evaluator module 404 as the main components.

Figure 11:
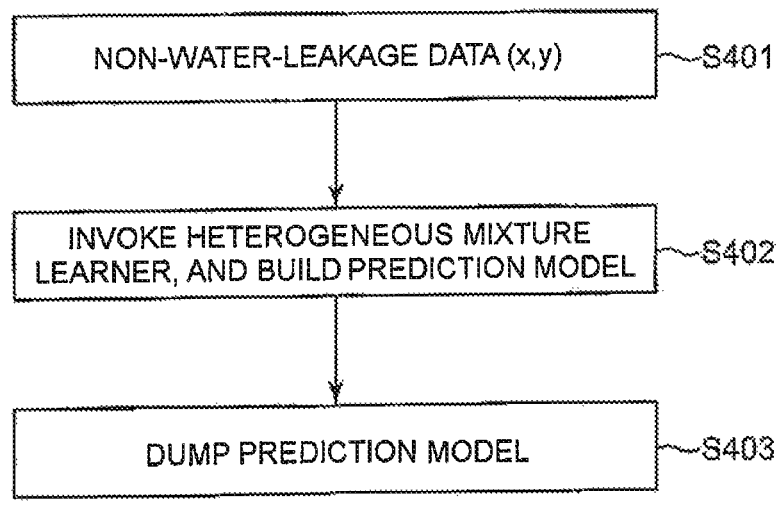
FIG. 11 is a flowchart for illustrating an operation of a learner module used for the learning unit illustrated in FIG. 10.

Referring to FIG. 11, first, a description will be given of an operation of the learner module 401.

First, the learner module 401 receives non-water-leakage data (x,y) (Step S401). On this occasion, Y represents the flow rate, and X contains the characteristics of the month, the hour, the weekday, and the holiday. Then, the learner module 401 invokes a heterogeneous mixture learner to build the prediction model (Step S402). Finally, the learner module 401 dumps the prediction model (Step S403).

Figure 12:
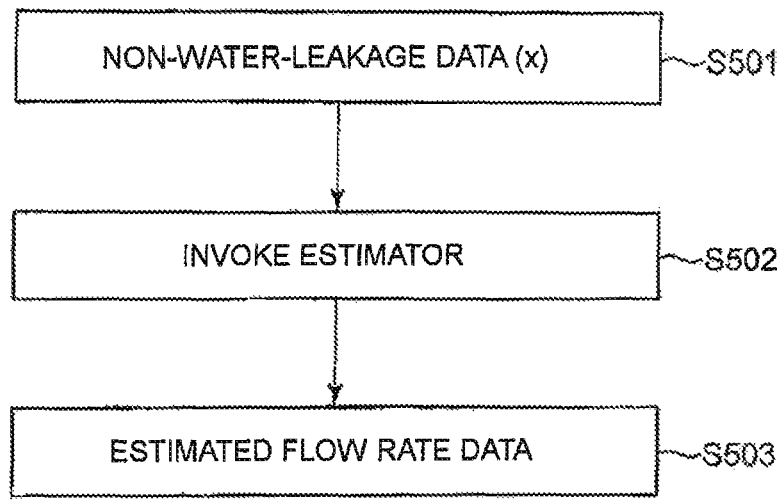
FIG. 12 is a flowchart for illustrating an operation of a predictor module used for the learning unit illustrated in FIG. 10.

Referring to FIG. 12, next, a description will be given of an operation of the predictor module 402.

First, the predictor module 402 receives non-water-leakage data (x) (Step S501). On this occasion, X contains the characteristics of the month, the hour, the weekday, and the holiday. Then, the predictor module 402 invokes a predictor (Step S502). Finally, the predictor module 402 obtains the predicted flow rate data 210 (see FIG. 2) (Step S503).

The scorer module 403 operates substantially in the same way as the water-leakage estimation unit 305 described referring to FIG. 9, and a detailed description thereof is thus omitted. Different points between the water-leakage estimation unit 305 and the scorer module 403 are as follows.

First, the current flow rate data 202 and the current environment condition data 204 containing the current calendar information and the current weather information are supplied as input data to the water-leakage estimation unit 305 while the past flow rate data 203 and the past environment condition data 205 containing the past calendar information and the past weather information are supplied as input data to the scorer module 403. Moreover, the optimal first and second score parameters 209 are used as the first and second score parameters in the water-leakage estimation unit 305 while the candidate first and second score parameters 208 are used as the first and second score parameters in the scorer module 403.

Figure 13:
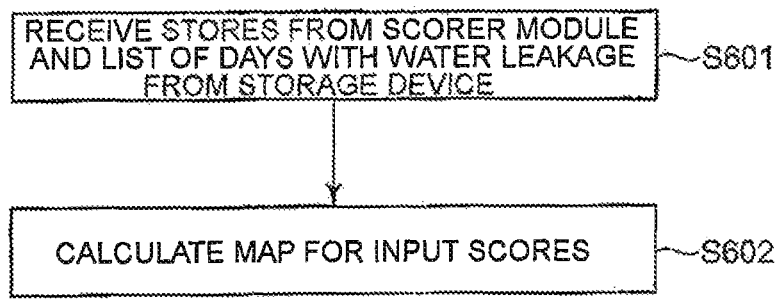
FIG. 13 is a flowchart for illustrating an operation of an evaluator module used for the learning unit illustrated in FIG. 10.

Referring to FIG. 13, next, a description will be given of an operation of the evaluator module 404.

First, the evaluator module 404 receives the scores from the scorer module 403 and the list of the days with the water leakage as the water-leakage information 206 from the storage device 104 (Step S601). Then, the evaluator module 404 calculates a MAP (mean average precision) for the input scores (Step S602). The MAP is an evaluation indicator for ranking for a search result and the like. The MAP is calculated in accordance with the following expression when ranking for a set of certain items and a set of N of correct items are given, and an order in the ranking for a correct item i is denoted by rank[i] (it is assumed that such sort that rank[i]<rank[j] if i<j has been carried out).

$$MAP = \frac{1}{N} \sum_{i=1}^{N} i/\text{rank}[i]$$

On this occasion, a MAP obtained by assuming a date on which the water leakage occurred as a correct answer is calculated in order to calculate a MAP for a set of dates in which the dates are ranked in a descending order of the input score.

In other words, the MAP is calculated in the following sequence.

1. The respective dates are sorted in the descending order of the scores obtained from the scorer module 403, and rankings are generated for the dates.
2. A list is formed by referring to an order in the rankings generated in 1, for each of the day with the water leakage.
3. The list of orders formed in 2, is sorted in the descending order, and is then considered as an array, rank, having the length N, and the MAP is calculated in accordance with the above-mentioned expression.

Figure 14:
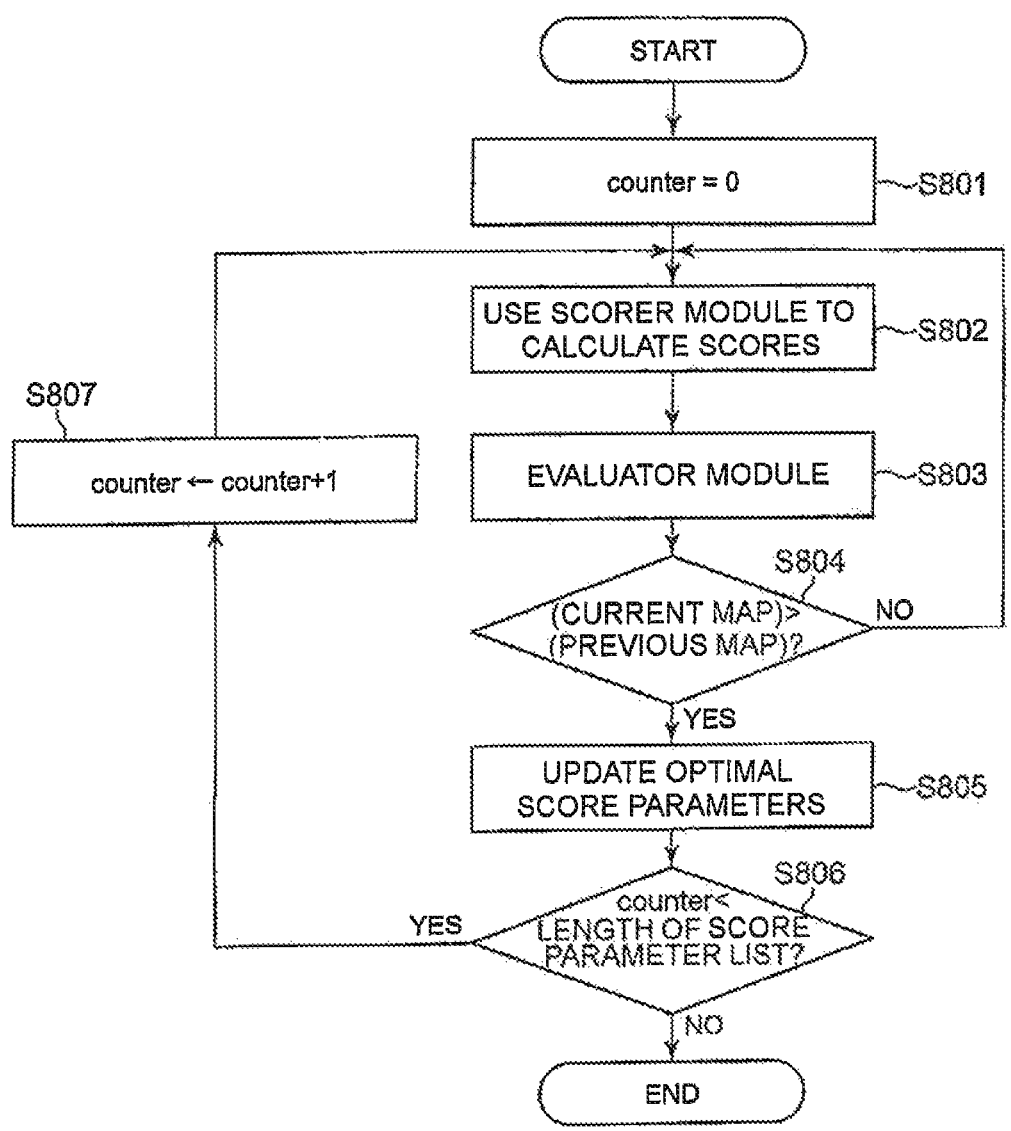
FIG. 14 is a flowchart for illustrating an operation for optimizing score parameters in the learning unit illustrated in FIG. 10.

FIG. 14 is a flowchart for illustrating the operation (S203) of optimizing the score parameters in the learning unit 304. Referring to FIG. 14, a description will be now given of an operation for optimizing the score parameters. The optimization of the score parameters is carried out through the scorer module 403 and the evaluator module 404 of the learning unit 304.

First, the learning unit 304 initializes the variable, counter, to 0 (Step S801). Then, the learning unit 304 uses the scorer module 403 to calculate the scores (Step S802). Subsequently, the learning unit 304 carries out an operation of the evaluator module 404 illustrated in FIG. 13 (Step S803).

Then, the learning unit 304 determines whether or not the current MAP is more than the previous MAP (Step S804). When the current MAP is not more than the previous MAP (NO in Step S804), the learning unit 304 returns to Step S802. When the current MAP is more than the previous MAP (YES in Step S804), the learning unit 304 updates the optimal score parameters (Step S805).

Then, the learning unit 304 determines whether or not the variable, counter, is less than the length of the score parameter list (Step S806). When the variable, counter, is less than the length of the score parameter list (YES in Step S806), the learning unit increments the variable, counter, by 1 (Step S807), and returns to Step S802. Meanwhile, when the variable, counter, is not less than the length of the score parameter list (NO in Step S806), the learning unit 304 finishes the operation.

The respective units of the water-leakage state estimation system 100 according to this embodiment may be implemented by a combination of hardware and software. In the form of the combination of hardware and software, the respective units are implemented as the respective types of means by operating a control unit (CPU) and the like based on a water-leakage state estimation program stored in a ROM. Moreover, the water-leakage state estimation program may be recorded in a recording medium, and is then distributed. The water-leakage state estimation program recorded in this recording medium is read into the memory wiredly, wirelessly, or via the recording medium itself, and then operates the control unit and the like. Examples of the medium include an optical disc, a magnetic disk, a semiconductor memory device, a hard disk, and the like.

The water-leakage state estimation system 100 according to this example embodiment configured in this way can precisely estimate the state of the water leakage in the specific area 12-2 of the water distribution network 10.

In the example embodiment described above, processing of the example embodiment may be executed by installing on a computer information stored in a computer-readable storage medium, which is coded with an instruction executable by a program, software, or a computer. The storage medium includes a transmission medium configured to temporarily record and hold data, for example, a network, in addition to a portable recording medium such as an optical disc, a floppy (trademark) disk, and a hard disk.

Modification Example

This invention has been described above with reference to the example embodiment, but this invention is not limited to the above-mentioned example embodiment. Various modifications understandable for a person having ordinary skill in the art may be made to the configurations and details of this invention within the scope of this invention.

For example, a description is given of the example embodiment while the calendar information and the weather information are given as examples of the environment condition data, but the environment condition data is not limited to those pieces of information, and may include information, for example, population information on people living in the specific area.

Moreover, a description is given of the example embodiment while the heterogeneous mixture learning is mentioned as an example of the learning, but the learning is not limited thereto, and may be other learning, for example, linear regression learning.

The whole or part of the example embodiment disclosed above can be described as, but not limited to, the following supplementary notes.

(Supplementary Note 1)

A water-leakage state estimation system, which is configured to estimate a state of a water leakage in a specific area of a water distribution network, the water-leakage state estimation system comprising:

a learning unit configured to:

receive labeled data, which is labeled so as to separate past flow rate data representing a water use amount measured in the past in the specific area into abnormal values and normal values, and past environment condition data representing environment conditions at measurement time instants of the past flow rate data;

build, through learning, a prediction model for predicting the normal values in the labeled data in response to the past environment condition data; and determine, through learning as well, a first score parameter required for using the prediction model to determine a water leakage, the first score parameter indicating a window width defining a length of a period involving data to be verified; and a water-leakage estimation unit configured to:

compare predicted flow rate data obtained by supplying current environment condition data representing current environment conditions into the prediction model and current flow rate data representing a water use amount currently measured in the specific area with each other to produce error values; and calculate an average value of the error values in the period of the window width defined by the first score parameter to estimate a water-leakage score representing a state of the water-leakage in the specific area.

(Supplementary Note 2)

A water-leakage state estimation system according to Supplementary Note 1, wherein the learning unit is configured to select an optimal first score parameter out of a plurality of candidate first score parameters as the first score parameter and to acquire the optimal first score parameter.

(Supplementary Note 3)

A water-leakage state estimation system according to Supplementary Note 2, wherein:

the learning unit is configured to determine, through learning as well, a second score parameter required for using the prediction model to determine a water leakage, the second score parameter indicating a threshold defining a magnitude of a deviation exhibited between the predicted flow rate data and the current flow rate data when the state is considered as a water leakage; and the water-leakage estimation unit is configured to compare the error values and the threshold defined by the second score parameter for binarization to obtain hinge transform error values, to thereby estimate the water-leakage score representing the state of the water leakage in the specific area.

(Supplementary Note 4)

A water-leakage state estimation system according to claim Supplementary Note 3, wherein the learning unit is configured to select an optimal second score parameter out of a plurality of candidate second score parameters as the second score parameter and to acquire the optimal second score parameter.

(Supplementary Note 5)

A water-leakage state estimation system according to Supplementary Note 1, further comprising a labeling unit configured to add a water-leakage label for the separation between the abnormal values and the normal values to the past flow rate data, to thereby generate a combination of water-leakage information representing the water-leakage label and the past flow rate data as the labeled data.

(Supplementary Note 6)

A water-leakage state estimation system according to claim Supplementary Note 1, wherein:

the past environment condition data includes past calendar information and past weather information; and the current environment condition data includes current calendar information and current weather information.

(Supplementary Note 7)

A water-leakage state estimation system according to Supplementary Note 1, wherein the learning comprises heterogeneous mixture leaning.

(Supplementary Note 8)

A water-leakage state estimation system according to Supplementary Note 3, further comprising an output device configured to visualize and output the water-leakage score together with values in a time series of the predicted flow rate data and values in a time series of the current flow rate data so that a relationship between the first score parameter and the second score parameter is recognizable.

(Supplementary Note 9)

A method of estimating a state of a water leakage in a specific area of a water distribution network through use of a water-leakage state estimation system, the method comprising:

a learning step, by a learning unit, of:

receiving labeled data, which is labeled so as to separate past flow rate data representing a water use amount measured in the past in the specific area into abnormal values and normal values, and past environment condition data representing environment conditions at measurement time instants of the past flow rate data;

building, through learning, a prediction model for predicting the normal values in the labeled data in response to the past environment condition data; and determining, through learning as well, a first score parameter required for using the prediction model to determine a water leakage, the first score parameter indicating a window width defining a length of a period involving data to be verified; and a water-leakage estimation step, by a water-leakage estimation unit, of:

comparing predicted flow rate data obtained by supplying current environment condition data representing current environment conditions into the prediction model and current flow rate data representing a water use amount currently measured in the specific area with each other to produce error values; and calculating an average value of the error values in the period of the window width defined by the first score parameter to estimate a water-leakage score representing a state of the water-leakage in the specific area.

(Supplementary Note 10)

A water-leakage state estimation method according to Supplementary Note 9, wherein, in the learning step, the learning unit is configured to select an optimal first score parameter out of a plurality of candidate first score parameters as the first score parameter and to acquire the optimal first score parameter.

(Supplementary Note 11)

A water-leakage state estimation system according to Supplementary Note 10, wherein:

the learning unit, in the learning step, is configured to determine, through learning as well, a second score parameter required for using the prediction model to determine a water leakage, the second score parameter indicating a threshold defining a magnitude of a deviation exhibited between the predicted flow rate data and the current flow rate data when the state is considered as a water leakage; and the water-leakage estimation unit, in the water-leakage estimation step, is configured to compare the error values and the threshold defined by the second score parameter for binarization to obtain hinge transform error values, to thereby estimate the water-leakage score representing the state of the water leakage in the specific area.

(Supplementary Note 12)

A water-leakage state estimation method according to Supplementary Note 3, wherein, in the learning step, the learning unit is configured to select an optimal second score parameter out of a plurality of candidate second score parameters as the second score parameter and to acquire the optimal second score parameter.

(Supplementary Note 13)

A water-leakage state estimation method according to Supplementary Note 9, further comprising a labeling step, by a labeling unit, of adding a water-leakage label for the separation between the abnormal values and the normal values to the past flow rate data, to thereby generate a combination of water-leakage information representing the water-leakage label and the past flow rate data as the labeled data.

(Supplementary Note 14)

A water-leakage state estimation method according to Supplementary Note 9, wherein:

the past environment condition data includes past calendar information and past weather information; and the current environment condition data includes current calendar information and current weather information.

(Supplementary Note 15)

A water-leakage state estimation method according to Supplementary Note 9, wherein the learning comprises heterogeneous mixture leaning.

(Supplementary Note 16)

A water-leakage state estimation system according to Supplementary Note 11, further comprising a visualizing step, by an output device, of visualizing and outputting the water-leakage score together with values in a time series of the predicted flow rate data and values in a time series of the current flow rate data so that a relationship between the first score parameter and the second score parameter is recognizable.

(Supplementary Note 17)

A computer-readable recording medium having recorded thereon a water-leakage state estimation program for causing a computer to estimate a state of a water leakage in a specific area of a water distribution network, the water-leakage state estimation program causing the computer to execute:

a learning procedure for:

receiving labeled data, which is labeled so as to separate past flow rate data representing a water use amount measured in the past in the specific area into abnormal values and normal values and past environment condition data representing environment conditions at measurement time instants of the past flow rate data;

building, through learning, a prediction model for predicting the normal values in the labeled data in response to the past environment condition data; and determining, through learning as well, a first score parameter required for using the prediction model to determine a water leakage, the first score parameter indicating a window width defining a length of a period involving data to be verified; and a water-leakage estimation procedure for:
  comparing estimated flow rate data obtained by supplying current environment condition data representing current environment conditions into the prediction model and current flow rate data representing a water use amount currently measured in the specific area with each other to produce error values; and
  calculating an average value of the error values in the period of the window width defined by the first score parameter to estimate a water-leakage score representing a state of the water-leakage in the specific area.

(Supplementary Note 18)

A computer-readable recording medium having recorded thereon the water-leakage state estimation program according to Supplementary Note 17, in which the learning procedure causes the computer to select an optimal first score parameter out of a plurality of candidate first score parameters as the first score parameter and to acquire the optimal first score parameter.

(Supplementary Note 19)

A computer-readable recording medium having recorded thereon the water-leakage state estimation program according to Supplementary Note 18, in which:
  the learning procedure causes the computer to determine, through learning as well, a second score parameter required for using the prediction model to determine a water leakage, the second score parameter indicating a threshold defining a magnitude of a deviation exhibited between the predicted flow rate data and the current flow rate data when the state is considered as a water leakage through learning; and
  the water-leakage estimation procedure causes the computer to compare the error values and the threshold defined by the second score parameter for binarization to obtain hinge transform error values, to thereby estimate the water-leakage score representing the state of the water leakage in the specific area.

(Supplementary Note 20)

A computer-readable recording medium having recorded thereon the water-leakage state estimation program according to Supplementary Note 19, in which the learning procedure causes the computer to select an optimal second score parameter out of a plurality of candidate second score parameters as the second score parameter and to acquire the optimal second score parameter.

(Supplementary Note 21)

A computer-readable recording medium having recorded thereon the water-leakage state estimation program according to Supplementary Note 17, the water-leakage state estimation program further causing the computer to execute a labeling procedure for adding a water-leakage label for the separation between the abnormal values and the normal values to the past flow rate data, to thereby generate a combination of water-leakage information representing the water-leakage label and the past flow rate data as the labeled data.

(Supplementary Note 22)

A computer-readable recording medium having recorded thereon the water-leakage state estimation program according to Supplementary Note 17, wherein:
  the past environment condition data includes past calendar information and past weather information; and
  the current environment condition data includes current calendar information and current weather information.

(Supplementary Note 23)

A computer-readable recording medium having recorded thereon the water-leakage state estimation program according to Supplementary Note 17, wherein the learning comprises heterogeneous mixture leaning.

(Supplementary Note 24)

A computer-readable recording medium having recorded thereon the water-leakage state estimation program according to Supplementary Note 19, the water-leakage state estimation program further causing the computer to execute a visualizing procedure for visualizing and outputting the water-leakage score together with values in a time series of the predicted flow rate data and values in a time series of the current flow rate data so that a relationship between the first score parameter and the second score parameter is recognizable.

INDUSTRIAL APPLICABILITY

This invention may be applied not only to the detection of the leakage of the water flowing through a water supply pipes, but also to applications including leakage detection for gas flowing through gas pipes and leakage detection for fluid, for example, liquid or gas flowing through other pipes.

This application is based upon and claims the benefit of priority from U.S. provisional application No. 62/160,743, filed on May 13, 2015, the entire disclosure of which is incorporated herein in its entirety by reference.

EXPLANATION OF REFERENCE NUMERALS 10 water distribution network
12-1 monitor area (specific area; DMA)
12-2 to 12-6 monitor area (DMA)
14 DMA flowmeter (flow rate sensor)
16 flowmeter and pressure regulating valve (flow rate sensor)
100 water-leakage state estimation system
101 communication I/F
102 input device
103 output device
104 storage device
105 data processing device
201 program
202 current flow rate data (actual measurement value)
203 past flow rate data
204 current environment condition data
205 past environment condition data
206 water-leakage information
207 prediction model (prediction equation of water use amount)
208 candidate score parameter
209 optimal score parameter
210 predicted flow rate data (predicted value)
211 water-leakage score
301 water use amount calculation unit
302 environment condition storing unit
303 labeling unit
304 learning unit
305 water-leakage estimation unit
401 learner module
402 predictor module
403 scorer module
404 evaluator module

The invention claimed is:

1. A water-leakage state estimation system, which is configured to estimate a state of a water leakage in a specific area of a water distribution network, the water-leakage state estimation system comprising:

a learning circuitry configured to:
  receive labeled data, which is labeled so as to separate past flow rate data representing a water use amount measured in the past in the specific area into abnormal values and normal values, and past environment condition data representing environment conditions at measurement time instants of the past flow rate data;
  build, through learning, a prediction model for predicting the normal values in the labeled data in response to the past environment condition data; and
  determine, through learning as well, a first score parameter required for using the prediction model to determine a water leakage, the first score parameter indicating a window width defining a length of a period involving data to be verified; and
a water-leakage estimation circuitry configured to:
  compare predicted flow rate data obtained by supplying current environment condition data representing current environment conditions into the prediction model and current flow rate data representing a water use amount currently measured in the specific area with each other to produce error values; and
  calculate an average value of the error values in the period of the window width defined by the first score parameter to estimate a water-leakage score representing a state of the water-leakage in the specific area.

2. The water-leakage state estimation system according to claim 1, wherein the learning circuitry is configured to select an optimal first score parameter out of a plurality of candidate first score parameters as the first score parameter and to acquire the optimal first score parameter.

3. The water-leakage state estimation system according to claim 2, wherein:
  the learning circuitry is configured to determine, through learning as well, a second score parameter required for using the prediction model to determine a water leakage, the second score parameter indicating a threshold defining a magnitude of a deviation exhibited between the predicted flow rate data and the current flow rate data when the state is considered as a water leakage; and
  the water-leakage estimation circuitry is configured to compare the error values and the threshold defined by the second score parameter for binarization to obtain hinge transform error values, to thereby estimate the water-leakage score representing the state of the water leakage in the specific area.

4. The water-leakage state estimation system according to claim 3, wherein the learning circuitry is configured to select an optimal second score parameter out of a plurality of candidate second score parameters as the second score parameter and to acquire the optimal second score parameter.

5. The water-leakage state estimation system according to claim 1, further comprising a labeling circuitry configured to add a water-leakage label for the separation between the abnormal values and the normal values to the past flow rate data, to thereby generate a combination of water-leakage information representing the water-leakage label and the past flow rate data as the labeled data.

6. The water-leakage state estimation system according to claim 1, wherein:
  the past environment condition data includes past calendar information and past weather information; and
  the current environment condition data includes current calendar information and current weather information.

7. The water-leakage state estimation system according to claim 1, wherein the learning comprises heterogeneous mixture leaning.

8. The water-leakage state estimation system according to claim 3, further comprising an output device configured to visualize and output the water-leakage score together with values in a time series of the predicted flow rate data and values in a time series of the current flow rate data so that a relationship between the first score parameter and the second score parameter is recognizable.

9. A method of estimating a state of a water leakage in a specific area of a water distribution network through use of a water-leakage state estimation system, the method comprising:
  receiving labeled data, which is labeled so as to separate past flow rate data representing a water use amount measured in the past in the specific area into abnormal values and normal values, and past environment condition data representing environment conditions at measurement time instants of the past flow rate data;
  building, through learning, a prediction model for predicting the normal values in the labeled data in response to the past environment condition data;
  determining, through learning as well, a first score parameter required for using the prediction model to determine a water leakage, the first score parameter indicating a window width defining a length of a period involving data to be verified;
  comparing predicted flow rate data obtained by supplying current environment condition data representing current environment conditions into the prediction model and current flow rate data representing a water use amount currently measured in the specific area with each other to produce error values; and
  calculating an average value of the error values in the period of the window width defined by the first score parameter to estimate a water-leakage score representing a state of the water-leakage in the specific area.

10. A non-transitory computer-readable recording medium having recorded thereon a water-leakage state estimation program for causing a computer to estimate a state of a water leakage in a specific area of a water distribution network, the water-leakage state estimation program causing the computer to execute:
  a learning procedure for:
    receiving labeled data, which is labeled so as to separate past flow rate data representing a water use amount measured in the past in the specific area into abnormal values and normal values and past environment condition data representing environment conditions at measurement time instants of the past flow rate data;
    building, through learning, a prediction model for predicting the normal values in the labeled data in response to the past environment condition data; and
    determining, through learning as well, a first score parameter required for using the prediction model to determine a water leakage, the first score parameter indicating a window width defining a length of a period involving data to be verified; and
  a water-leakage estimation procedure for:
    comparing estimated flow rate data obtained by supplying current environment condition data representing current environment conditions into the prediction model and current flow rate data representing a water use amount currently measured in the specific area with each other to produce error values; and calculating an average value of the error values in the period of the window width defined by the first score parameter to estimate a water-leakage score representing a state of the water-leakage in the specific area.

* * * * *